(12) United States Patent
Overton et al.

(10) Patent No.: US 9,357,141 B2
(45) Date of Patent: May 31, 2016

(54) METHOD AND APPARATUS FOR REMOTELY CONTROLLING A LIVE TV PRODUCTION

(75) Inventors: Kenneth J. Overton, Burbank, CA (US); Alcuin D. Fong, Burbank, CA (US); Gaines S. Johnson, Burbank, CA (US); Frank C. Guida, Burbank, CA (US)

(73) Assignee: DISNEY ENTERPRISES, INC., Burbank, CA (US)

( * ) Notice: Subject to any disclaimer, the term of this patent is extended or adjusted under 35 U.S.C. 154(b) by 326 days.

(21) Appl. No.: 13/161,203

(22) Filed: Jun. 15, 2011

(65) Prior Publication Data
US 2012/0320196 A1 Dec. 20, 2012

(51) Int. Cl.
H04N 5/268 (2006.01)
H04N 7/18 (2006.01)

(52) U.S. Cl.
CPC ............. *H04N 5/268* (2013.01); *H04N 7/181* (2013.01)

(58) Field of Classification Search
None
See application file for complete search history.

(56) References Cited

U.S. PATENT DOCUMENTS

| | | | |
|---|---|---|---|
| 5,264,933 A | 11/1993 | Rosser et al. | |
| 5,767,894 A * | 6/1998 | Fuller | H04N 7/17318 348/584 |
| 6,438,753 B1 * | 8/2002 | Fegesch | H04N 5/28 348/722 |
| 6,466,275 B1 * | 10/2002 | Honey | H04N 5/222 348/157 |
| 6,952,221 B1 * | 10/2005 | Holtz | G11B 27/034 715/719 |
| 7,783,154 B2 * | 8/2010 | Wilkins | G06F 17/3028 386/281 |
| 8,471,890 B1 * | 6/2013 | Golas | H04N 7/15 348/14.08 |
| 2004/0078825 A1 * | 4/2004 | Murphy | H04N 7/147 725/109 |
| 2004/0212679 A1 * | 10/2004 | Jun | G08B 13/19693 348/159 |
| 2004/0261127 A1 * | 12/2004 | Freeman | G03C 1/26 725/135 |
| 2006/0028399 A1 * | 2/2006 | Glen | G06F 3/1438 345/2.3 |
| 2006/0053472 A1 * | 3/2006 | Goto | H04N 5/4403 725/141 |

(Continued)

OTHER PUBLICATIONS

Case Study, "A Really Long Distance File-Based Workflow Running on Omneon MediaDecks", Sep. 2010, Omneon Now Part of Harmonic, download from the Internet: http://www.omneon.com/downloads/CaseStudy_NBC_Beijing_Olympics.pdf, 2pgs.

*Primary Examiner* — Dave Czekaj
*Assistant Examiner* — Tyler W Sullivan
(74) *Attorney, Agent, or Firm* — McCormick, Paulding & Huber LLP

(57) ABSTRACT

According to some embodiments, methods, systems, apparatus, and computer program products are provided which allow the remote production of live events by capturing, at a remote event site, event video data in a first time horizon. The event video data is compressed to a proxy of the event video data, and the proxy event video data is transmitted to a remote production facility. A switcher at the production facility is operated to generate commands to produce a proxy program using the proxy event video data. The commands are then transmitted to the remote event site to cause a shadow switcher to produce a cut program in third time horizon delayed from the second time horizon, where the cut program is produced using the event video data. The cut program is transmitted to the production facility. The resulting program is the broadcast program that can be broadcast and distributed.

22 Claims, 10 Drawing Sheets

(56) References Cited

U.S. PATENT DOCUMENTS

| | | | |
|---|---|---|---|
| 2006/0130112 A1* | 6/2006 | Stewart | H04N 7/17318 725/115 |
| 2007/0250852 A1* | 10/2007 | Adams | G11B 27/034 725/28 |
| 2007/0288978 A1* | 12/2007 | Pizzurro | H04N 7/17336 725/112 |
| 2008/0184245 A1* | 7/2008 | St-Jean | G06K 9/00771 718/103 |
| 2009/0034933 A1 | 2/2009 | Rich | |
| 2009/0064246 A1* | 3/2009 | Bell | H04N 21/4722 725/105 |
| 2009/0187826 A1* | 7/2009 | Heimbold | H04N 5/262 715/719 |
| 2010/0103320 A1* | 4/2010 | Casper | H04N 5/268 348/659 |
| 2010/0192178 A1* | 7/2010 | Candelore | G06K 9/325 725/39 |
| 2011/0013087 A1* | 1/2011 | House | A63B 24/0021 348/564 |
| 2011/0013836 A1 | 1/2011 | Gefen et al. | |
| 2011/0026899 A1 | 2/2011 | Lussier et al. | |
| 2011/0090344 A1 | 4/2011 | Gefen et al. | |
| 2011/0126252 A1* | 5/2011 | Roberts | H04N 7/17318 725/114 |
| 2011/0202967 A1* | 8/2011 | Hecht | G11B 27/034 725/114 |
| 2012/0314077 A1* | 12/2012 | Clavenna, II | H04N 21/2187 348/159 |

* cited by examiner

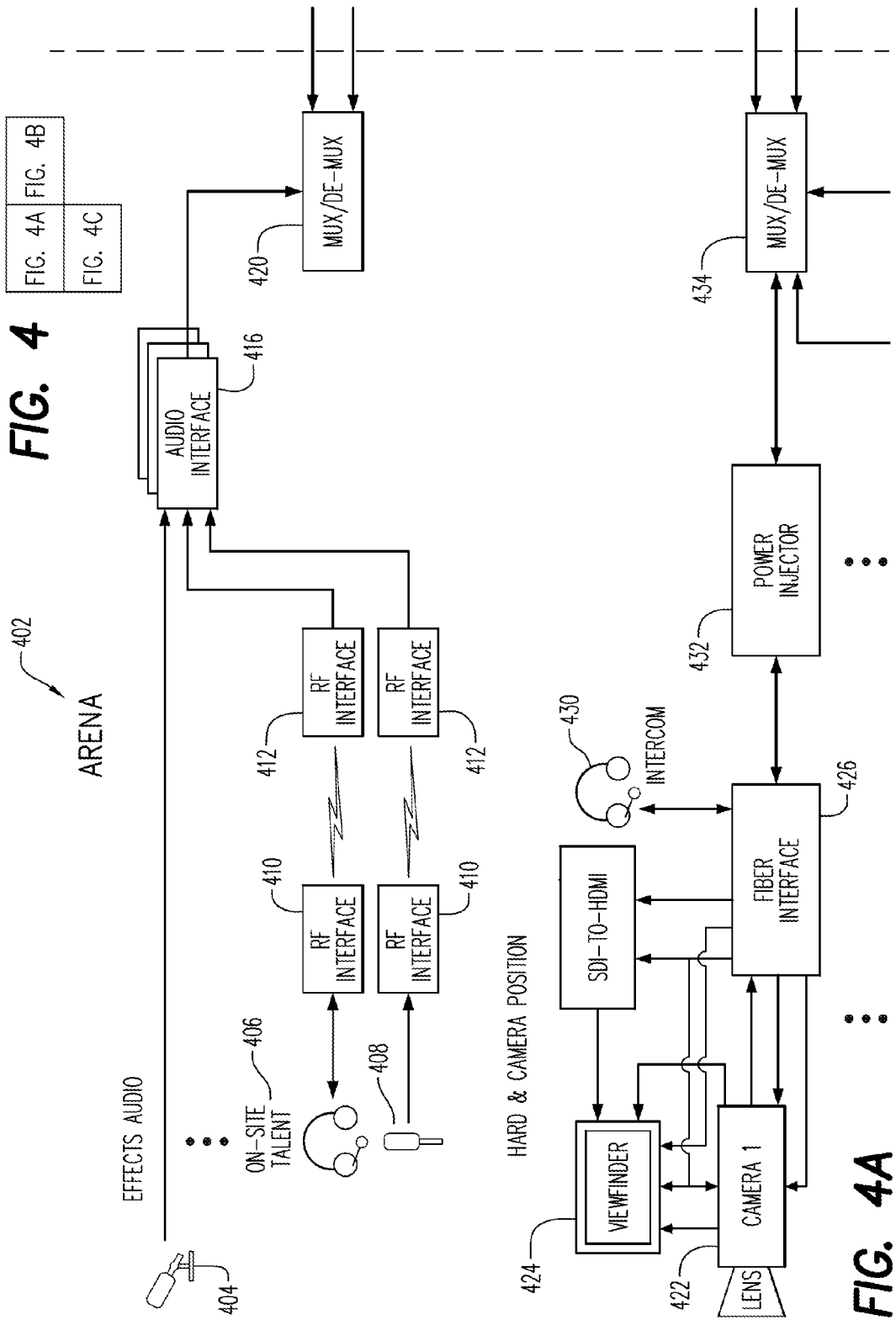

US 9,357,141 B2

METHOD AND APPARATUS FOR REMOTELY CONTROLLING A LIVE TV PRODUCTION

FIELD

The present invention relates to methods and apparatus for remotely controlling live television or broadcast productions.

BACKGROUND

Many broadcast programs are produced and broadcast live or substantially live. For example, many sports fans love to watch their teams play on television as the event happens. The cost and complexity to produce and distribute these events can be quite high, making it impractical to broadcast certain events live. As a result, many events are not broadcast live, as the potential interest may not justify the cost. As a specific example, many college sporting events are not broadcast live to a nationwide audience. While a Michigan football fan may enjoy the chance to watch every game in a live broadcast during the season, a New Mexico State University football fan will likely see very few games each season, if any.

One significant reason these live broadcasts are currently so costly is that they require a significant amount of equipment and staff at the event to produce. Current remote production includes transporting and setting up a temporary production facility on-site at each event. For example, referring to FIG. 1, a block diagram depicting a typical configuration of a system 100 for producing a live event is shown. Commonly, the equipment is delivered to the remote event site in one or more production trucks 130. The equipment includes, for example, a number of camera rigs 132a-n which are positioned around the event to capture different images and angles. The camera rigs 132a-n are in communication with a number of camera video units 134 (which are frequently located in the production truck 130) which provide video and audio feeds to a router or control system 140. A number of engineering and production personnel (not shown in FIG. 1) are required to configure and operate the systems, provide engineering support (e.g., to operate systems including digital video equipment (DVE) 142), cut and insert tape and graphics (e.g., using tape systems 144), control and direct the production, provide voice talent, etc. The captured event video and audio, graphics, and voice talent are combined and edited in the production truck 130 and encoded and backhauled (over backhaul channel 120) to a remotely located master studio for transmission to different distribution channels.

In a typical remote event broadcast, in addition to camera operators, ten or more support personnel may be required to produce a broadcast event. These personnel must travel to the event location, and are typically occupied for one or more full days during preparation, broadcast, and breakdown of the equipment.

Different sports or events have different equipment requirements and cost. For example, the production of a broadcast of a baseball game may require two days of setup, production and break down, and the use of five (5) cameras, while the production of the broadcast of a football game may require two days and the use of seven (7) cameras. While several attempts have been made to remotely produce live event broadcasts, network limitations can make it difficult to do so for many events. For example, in the case where a live event is at a location geographically separated from a production control facility, and the broadcast is to be produced using high definition video signals (e.g., 1,920×1,080 pixel resolution), network bandwidth limitations can make it difficult if not impossible to remotely produce the broadcast. For example, if five cameras at the remote event site capture high definition video, the uncompressed video signals alone would require approximately 8 Gb per second of bandwidth to transmit to the remote production control facility. A typical satellite backhaul channel between the remote event site and a production control facility may have substantially less than 1 Gb per second of bandwidth available. As such, in most situations, it is not possible to remotely produce such events using existing systems.

One approach to provide some limited remote production capability has been attempted by the assignee of the present invention to allow a production crew at a production location to switch to video and audio from a sideline reporter at a remote event. The approach requires a second satellite uplink feed to be provided from the remote event which contains the video and audio from the sideline reporter. The production crew at the production location may selectively switch between the main program (transmitted from the remote event over a first satellite uplink channel) to the video and audio from the sideline reporter (transmitted over the second satellite uplink channel). While the approach allows some limited production at the remote production location, it still does not allow the full event to be remotely produced using existing network infrastructure.

As a result, it would be desirable to provide methods and systems which allow broadcasts of live events to be remotely produced using existing network infrastructures.

DETAILED DESCRIPTION

Figure 1:
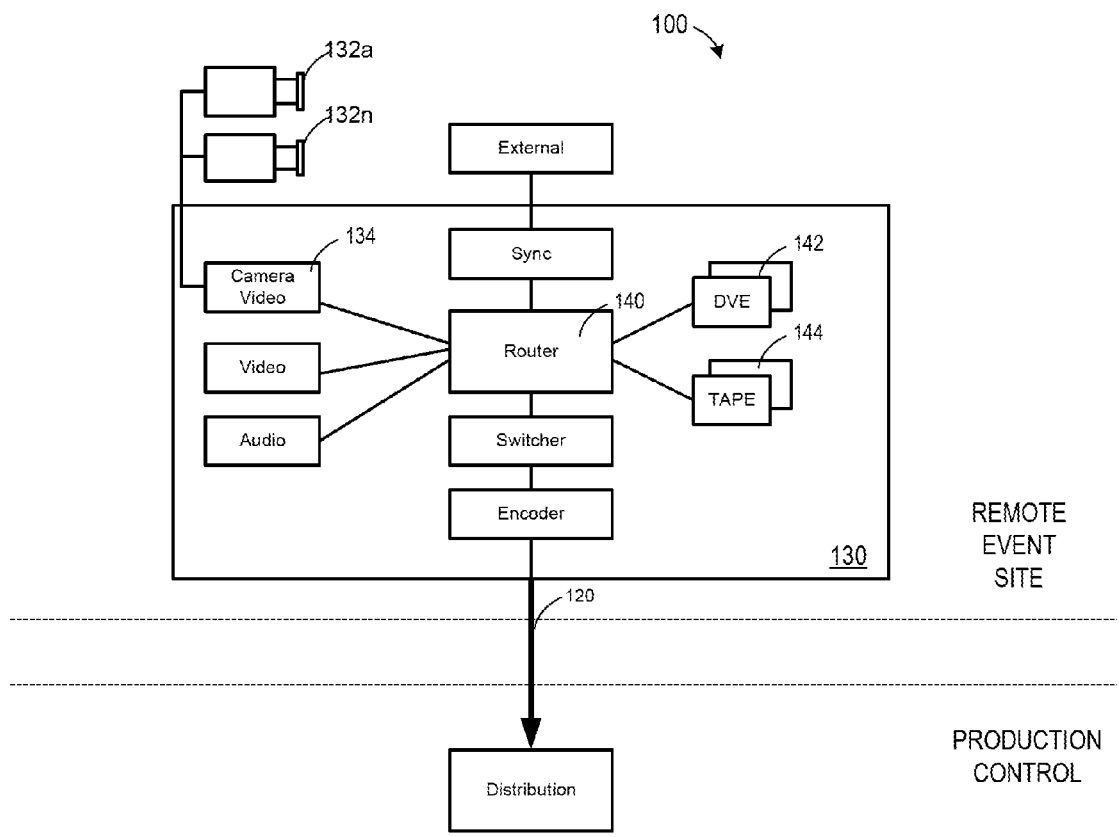
FIG. 1 is a block diagram of portions of a typical prior art remote production configuration.

Applicants have recognized that there is a need for methods, systems, apparatus, means and computer program products to efficiently produce remote broadcast events from a centralized location (e.g., such as from a master studio). Pursuant to some embodiments, methods, systems, apparatus, means and computer program products are provided which allow the remote production of live events by capturing, at an event location, event video data and event audio data in a first time horizon. The event video data are converted to a proxy of the event video data, and the proxy event video data and the event audio data are transmitted to a production control facility remote from the event location. In some embodiments, the video data is first compressed into a lower bandwidth-consuming proxy signal, and then the proxy signal is transmitted to the production control facility. When received at the production control facility, the proxy signal may be uncompressed. A video production switcher ("switcher") at the production control facility is operated to generate commands to produce a proxy program using the proxy event video data and the event audio data. The commands are associated with a second time horizon delayed from the first time horizon. The commands are then transmitted to the remote event site to cause a second (unmanned) switcher to produce a cut program in a third time horizon delayed from the second time horizon, where the cut program is produced using the event video data and the event audio data delayed to be in the same time horizon as the proxy video when the proxy was created. The cut program is transmitted to the production control facility, where additional data may be keyed into the cut program in a fourth time horizon, where the fourth time horizon is delayed from the first, second and third time horizons. The resulting program is the broadcast program that can be broadcast and distributed using current broadcast methods.

Features of some embodiments provide a television broadcast production architecture which allows centralization of a substantial portion of the production elements required to produce a broadcast program while maintaining and substantially improving the quality and consistency of productions. Embodiments provide particularly desirable results when used in the production of broadcasts of live events, such as sporting events or the like. As used herein, the event location is referred to as the "remote event site". Embodiments provide systems and methods to split the equipment and functions typically required to be performed on-site to remotely produce an event broadcast. Some items of equipment remain on-site, such as the cameras and microphones used to capture the event, along with the associated operational personnel (such as camera operators, etc.). However, much of the remaining equipment and personnel typically required on-site are capable of being moved to a central location (referred to herein as a "production control facility).

A number of concepts and terms are used herein to describe features of some embodiments. A first concept is the concept of a "time horizon" which refers to a temporal relationship of signals associated with an event as experienced at different points in the process. The production of broadcast programs pursuant to the present invention may involve identifying one or more time horizons which are used to identify temporal alignments of signals. The temporal alignments may be performed in any of a number of different ways, including by instituting time delays (or adjusting for latency of signals), by tagging frames of a video signal using a monotonic identifier such as a frame counter, time stamp, field counter or real time clock (such as from a clock associated with a global positioning system "GPS" satellite system), or the like. For simplicity and ease of exposition, embodiments will be described by reference to the use of a "delay" used to perform the temporal realignment. Those skilled in the art, upon reading this disclosure, will appreciate that the term "delay" as used herein refers to a temporal realignment which may include a time delay or latency, or tagging with a monotonic identifier (such as a frame counter, time stamp, field counter, clock, or the like).

A second concept of the present invention is the concept of a "proxy" (e.g., such as a "proxy video signal" or "proxy program"). As used herein, the term "proxy" is used to refer to a representation of an original signal or program that requires less bandwidth than the original signal). In general, as used herein, a "proxy" is a compressed version of an original signal that is also more compressed than the final version of a program to be broadcast. For example, the term "proxy video signal" is used to refer to a representation of an original video signal captured by a camera. The proxy video signal may be, for example, a standard definition ("SD") signal encoded using any of a number of encoding schemes (such as, for example, MPEG4), a high definition ("HD") signal downconverted to SD and then encoded (e.g., using MPEG4 or the like), or an HD signal directly encoded (e.g., using MPEG4 or the like). The "original video signal" may be a video signal from a camera in SD or HD or a stereoscopic signal. As used herein, the term "SD" may include any reduced definition signal.

Those skilled in the art, upon reading this disclosure, will appreciate that "proxy" signals and programs may be generated using a variety of different "compression" techniques, where "compression", as used herein, refers to the transformation of a signal into a form for transmission that consumes lower bandwidth than transmitting the un-transformed signal would consume. For example, the term "compression", as used herein, includes "converting", "encoding" and other transformations of a signal to a signal requiring lower bandwidth. As a specific example, as used herein, a "proxy video signal" is a signal that is more "compressed" than the original video signal. For convenience, the term "compression" may also be referred to as "encoding" (e.g., where a signal is encoded using one or more encoding devices to reduce the size or bandwidth required for transmitting the signal).

Pursuant to some embodiments, a result of the compression of an original signal (to create a "proxy" of the signal) is that the proxy requires substantially less bandwidth than the original signal and may be transmitted over existing transmission channels. Pursuant to embodiments of the present invention, the proxy signals are useable to cut the broadcast program and require substantially less bandwidth than the original signal.

In general, as used herein, the term "remote" (when referring to a "remote event site") refers to the geographical or other separation of an event site from a production control facility. Features of embodiments of the present invention provide particularly beneficial results when used in situations where the separation of the remote event site from the production control facility involves use of a transmission channel which has a bandwidth that is smaller than the size of the video and other signals to be transmitted from the remove event site to the production control facility. Features of some embodiments will now be described by reference to FIG. 2 which is a simplified block diagram of portions of a system 200 pursuant to some embodiments. In the simplified block diagram of the system 200, only selected components are depicted in order to illustrate the shifting of equipment and personnel from the remote event site to a production control facility. Further details of the signal flows and equipment at both the remote event site and the production control facility will be described further below in conjunction with FIGS. 3-5.

Figure 2:
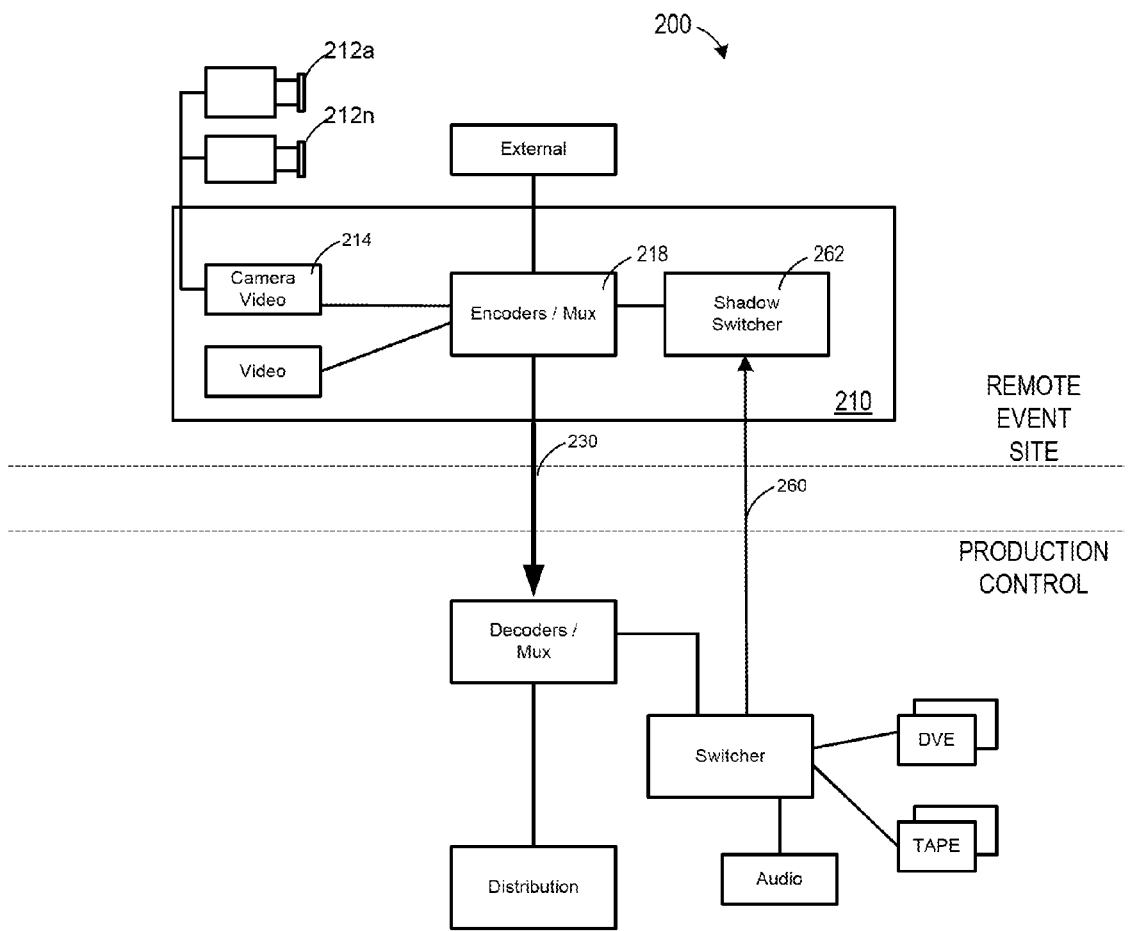
FIG. 2 is a block diagram of a system in accordance with some embodiments of the present invention.

As shown in FIG. 2, embodiments of the present invention utilize a system 200 in which much of the equipment and personnel typically required to be physically located at a remote event site (such as in the prior systems shown in FIG. 1) are moved to a production control facility. Some equipment is still required to be operated at the remote event site, and the equipment may be delivered to the remote event site in a production vehicle 210. As a result of the significant reduction in the amount and type of equipment required at the remote event site, rather than a large production truck (such as a semi-trailer truck), embodiments may allow remote events to be broadcast from a smaller, less expensive vehicle such as a panel van, referred to herein as a "van". Equipment provided at the remote event site may include a number of camera rigs 212a-n in communication with one or more camera video units 214 to provide video and audio feeds. The video and audio data are provided to a number of encoders and multiplexors 218 for encoding and transmission over a backhaul channel 230 to a production control facility remotely located from the event.

In general, the camera crew and camera equipment at the remote event site function in the normal manner, with the cameramen shooting the event with the broadcast camera rigs 212a-n positioned in the normal locations. The audio signals and proxies of the video signals are transmitted to the remote production control facility. The personnel and equipment at the remote production facility operate on the audio signals and the proxies of the video signals (received over the backhaul channel 230 with estimated delays factored in as will be described further below in conjunction with FIG. 3) to create a complete (proxy) production using the received proxy signals. The commands or control signals used at the production control facility to control what shots comprise the cut program (which may be commands to operate a switcher at the production control facility) are transmitted back to the remote event site via a low-bandwidth, bi-directional communication channel 260 (referred to herein as a "fronthaul") where the proxy production signals are implemented by equipment shadowing the equipment at the remote production control facility (shown as shadow switcher 262). The shadow switcher implements commands used in the production facility to create an actual production which is transmitted back to the production control facility over backhaul channel 230 for broadcast and distribution. A used herein, the term "shadow switcher" generally refers to a switcher located at the remote event site that executes the same commands as a primary switcher located at the production control facility. The announcers, tape, digital video engineers and other staff (as well as their related equipment) may be located at the production control facility rather than at the remote event site, allowing significant reductions in the cost of producing and broadcasting remote events.

Further details of the timing, equipment and signals used pursuant to some embodiments will now be described by referring first to FIG. 3 where a block diagram of certain functional components of a system 300 pursuant to some embodiments is shown. As depicted, a number of components or functions are provided at the event location, however, the bulk of the functionality to produce a broadcast event is located at a remote production facility. In general, the functional block diagram 300 of FIG. 3, will be used to describe timing and signal features associated with the production of a broadcast pursuant to some embodiments.

Figure 3:
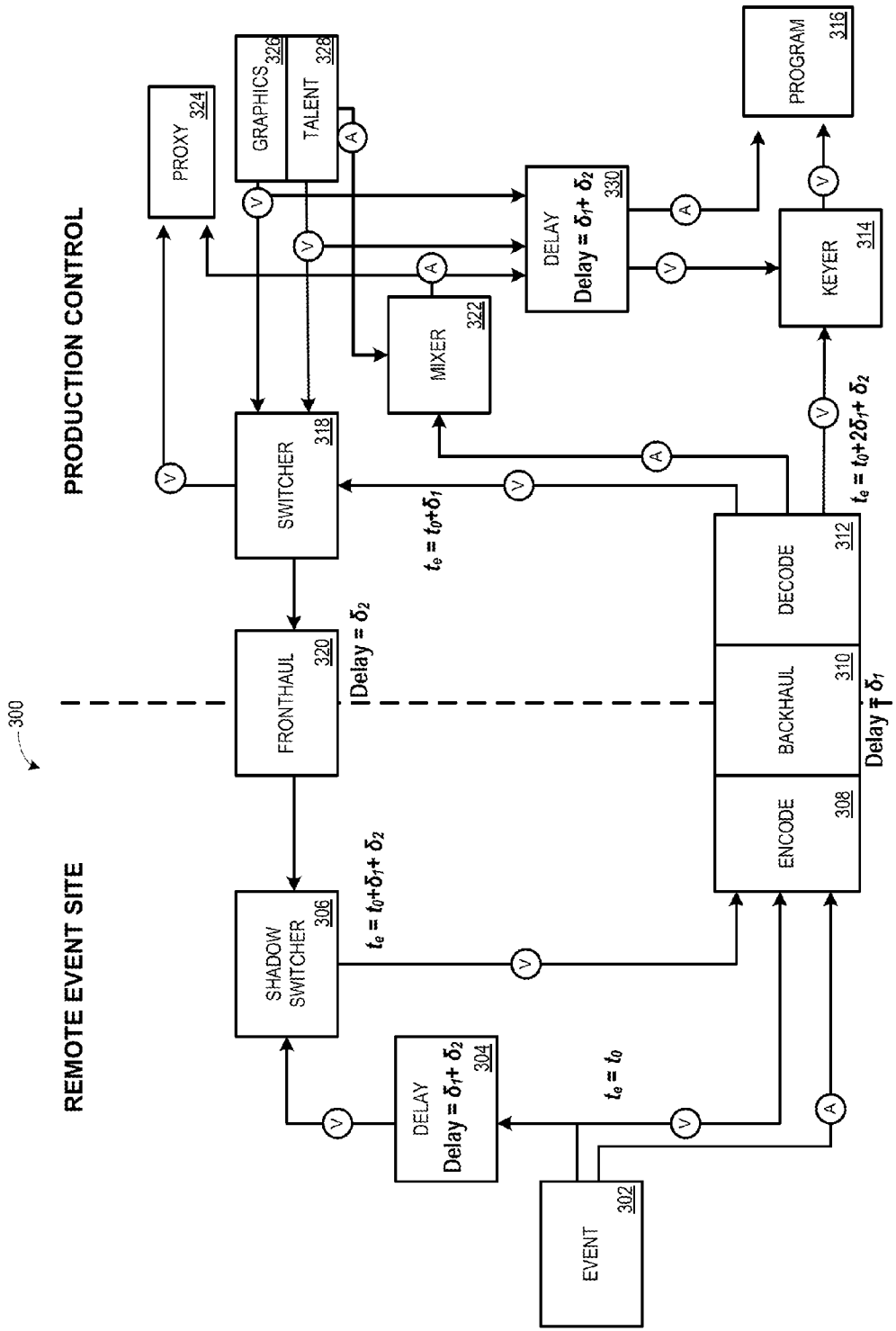
FIG. 3 is a block diagram of portions of a system including timing information in accordance with some embodiments of the present invention.

In general, the description of FIG. 3 will follow the general path of the signals from the event 302 to the broadcast of a program 316. Timing information is shown in association with certain functional blocks, and signal types are generally depicted as either video ("V") or audio ("A") to facilitate an understanding of some embodiments of the invention. Beginning at the event 302, on-site cameras and microphones (not shown) are operated to create signals representing the event in real time. These signals are depicted in the timing information as "$t_e = t_0$," (where "$t_0$" is a point in time when an event, such as tip off in a basketball game, or kick off in a football game, occurs). The timing marker is used for the purpose of comparing time horizons in various stages of the production process of the present invention.

These audio and video signals are transmitted to a common location at the event (typically in a production vehicle such as a van) for encoding 308, transmission over a backhaul channel 310, and decoding 312 (at the production facility). The high definition ("HD") video signals may be down-converted to standard definition ("SD") signals or other reduced-definition signal types as part of the compression process to create proxy signals. In general, transmission of the signals from the cameras and microphones to the van and the encoder 308 is considered to happen substantially in real time (i.e., without any practical delay).

In some embodiments, the audio and converted video signals may be encoded (e.g., as MPEG-4) and multiplexed (along with some additional signals received from a shadow switcher 306 described below) into a single Asynchronous Serial Interface ("ASI") stream. Due to the latency or delay associated with transmission over a backhaul channel (which may be, for example, a satellite or fiber backhaul transmission path between the event site and the production facility), a first known delay is associated with the feed (shown as "Delay=$\delta_1$"). In general, for a satellite backhaul channel, the latency typically encountered in the encode/multiplex/backhaul/de-mux/and decode path (items 308, 310 and 312) is variable depending on a number of factors, but is generally in the range of 0.75 to 1.00 seconds. This delay is set as the first defined delay.

The ASI stream is received at the production facility, demultiplexed, and decoded. This stream is referred to as a "proxy" of the live event, and is used to create a proxy program 324. The proxy event data stream, consisting of the decoded audio and video signals, is then used by the production team to create a proxy of the show as if the production was done on site (but using SD video, for example). While the production team is producing the proxy program live, the timing "reality" for the production team (at the switcher 318) operating on the proxy program is behind event reality ($t_0$) by the latency $\delta_1$ ($t_e = t_0 + \delta_1$). That is, the production crew (at the production facility) sees the proxy event as if it were the live event. The production crew and engineers produce the show by creating graphics 326 and providing commentary and other voice talent 328 which are combined with the proxy program at the switcher. In some embodiments, such as depicted in FIG. 3, the graphics, cutting and voice data are provided at the production control facility by interacting with the proxy program in the time context of the proxy program (e.g., slightly delayed from the live event). In some embodiments, one or more functions may be performed at the remote event site. For example, in some embodiments, some or all of the graphics functions may be performed by an operator at the remote event site. Other combinations may be provided to further enhance productivity, efficiency or the like.

For example, the booth talents 328 observe the event through the proxy program feeds provided to their booth in production control. As they add commentary and analysis, it is provided in the time horizon experienced at the production control facility (i.e., delayed by $\delta_1$). In some embodiments, some or all of the booth talents may be located at the remote event site.

The commands invoked by operators in the production control facility (such as the producer and director) are both entered into the production control switcher 318 and are also transmitted to a shadow switcher 306 at the remote event site through fronthaul channel 320. The transmission of the commands over the fronthaul channel 320 path results in the introduction of additional latency shown as Delay=$\delta_2$. This additional latency is typically less than about 100 ms. In general, the human reaction times (of the voice talent, operators, etc.) are assumed, for the purposes of timing, to be substantially zero (although the human reaction times are generally normalized out of the system and are generally irrelevant).

The control commands (invoked by operators in the production control facility and transmitted via fronthaul channel 320) are received by a shadow switcher 306 at the remote event site in a third time horizon: $t_e=t_0+\delta_1+\delta_2$. To synchronize the HD video feeds at the event site with the cutting commands from the production control facility, a delay 304 is introduced. The delay 304 is equivalent to the sum of the backhaul channel 310 and fronthaul channel 320 latencies, or Delay=$\delta_1+\delta_2$. The addition of this delay 304 effectively puts the video at the shadow switcher 306 in the same time horizon as the video at the switcher 318 at the production control facility. The control commands are executed by the shadow switcher 306 to cut the HD signals to produce a cut program. The cut program is passed from the shadow switcher 306 to the encoder 308 (as well as multiplexors, not shown) where it is encoded (e.g., as MPEG-4), multiplexed with the proxy camera signals (from the event, and which are from a later instant in time at that point), and transmitted over backhaul channel 310 to production control. Then, they are de-multiplexed and decoded back to baseband signals. This second pass through the backhaul channel 310 introduces a further latency. That is, the cut program arrives at production control in a fourth time horizon: $t_e=t_0+2\delta_1+\delta_2$.

At this point, graphics 326 and booth talent video 328 are keyed (using keyer 314) into the cut program to produce a final video. Any content generated in the production control facility must be delayed (by delay 330) in order to be properly synchronized when the cut program is received at production control. The amount of the delay added at 330 is equal to the fronthaul channel latency plus the second backhaul latency (or Delay=$\delta_1+\delta_2$). In some embodiments, the keying of the production control content is assumed to introduce no further delay. In some embodiments, the delay 330 and the keyer 314 functions may be implemented by a mix effects unit provided in the switcher 318. Finally, the audio sub-mix is added to the final video to produce the finished program 316. Regarding the audio, the original master audio signals received from the event were transmitted from the event along with the proxy video feeds. The audio mix (using mixer 322) is performed in real time at production control as the proxy program is being cut. In some embodiments, by carrying the audio signals with the original proxy video, temporal alignment is maintained as the signals are following the same path and experiencing the same actual delays. However, in some embodiments, the audio sub-mix is delayed in the same manner as the other content (graphics, etc.) generated in production control before it is added to the final video in order to produce the final program 316. In this manner, embodiments allow the remote production of a live event. The result is systems and methods which significantly reduce the expense, time and labor required to produce broadcasts of live events. Further, systems and methods of the present invention are independent of geographic separation between the event and the production control. That is, similar techniques may be used for the remote production of local, national, or international events by adjusting any latency assumptions.

Those skilled in the art, upon reading this disclosure, will appreciate that FIG. 3 is a conceptual block diagram intended to illustrate certain features of embodiments (such as the time horizons associated with different signals and components), and that certain functions and components described in FIG. 3 may be implemented using a variety of devices or combinations of devices. For example, some of the functions shown as separate blocks may be implemented using a single component or set of components. As a specific illustrative example, a mix effects unit may be implemented within the switcher 318 which also provides a delay or temporal realignment feature. Such an implementation may replace a separate mixer 322 and temporal realignment or delay 330.

As can be seen in FIG. 3, there are two locations in the system 300 where video signals are delayed. First, at the remote event site, the camera captured video signals are delayed 304 before being fed to the shadow switcher 306. Second, at the production control facility, the graphics and talent video are delayed 330 before being fed into the keyer 314. Hence, the time corresponding to these delays may be utilized to carry out video processing where metadata may be extracted. For example, in some embodiments, the video processing may be performed using a video processor unit (which may be, for example, located at either the remote event site or at the production control facility).

In some embodiments, a video processor unit may be added at the remote event site, and the video processing may be performed on the original video signals. In some embodiments, the video processor unit may be located at the production control facility, and the video processing may be performed on the proxy video signals (or the proxy cut program). While locating the video processor unit at the production control facility may result in somewhat reduced accuracy of the output, the potential operational cost savings may justify such reductions in accuracy. Further, it may be advantageous to do most of the production-related processing at the production control facility where more computing resources are available.

Pursuant to some embodiments, the video processor unit (whether located at the remote event site or the production control facility) may be operated to extract metadata that may be used by the keyer to render the graphics in a desired way. For example, as described in U.S. Pat. No. 5,264,933 by Rosser et al., metadata that contain the current camera's parameters may be used to render graphics into the scene's background in a way that is consistent with the camera's motion and perspective. In other pending U.S. patent application Ser. Nos. 12/403,857 and 12/907,607, extraction of metadata that contain the positional data of moving objects is described. Thus, in this case, using such metadata allows insertion of graphics relative to moving objects.

Further, systems incorporating features of the present invention may be implemented using a variety of different components. For example, a wide variety of cameras, converters, multiplexors, de-multiplexors, switchers, or the like may be used in conjunction with the timing, configuration and processes of the present invention while still allowing features of the invention to be achieved. As one specific and illustrative (but not limiting) example of an implementation, a description of components and equipment used at a remote event site and at a remote production facility will now be described by reference to FIGS. 4 and 5.

Figure 4B:
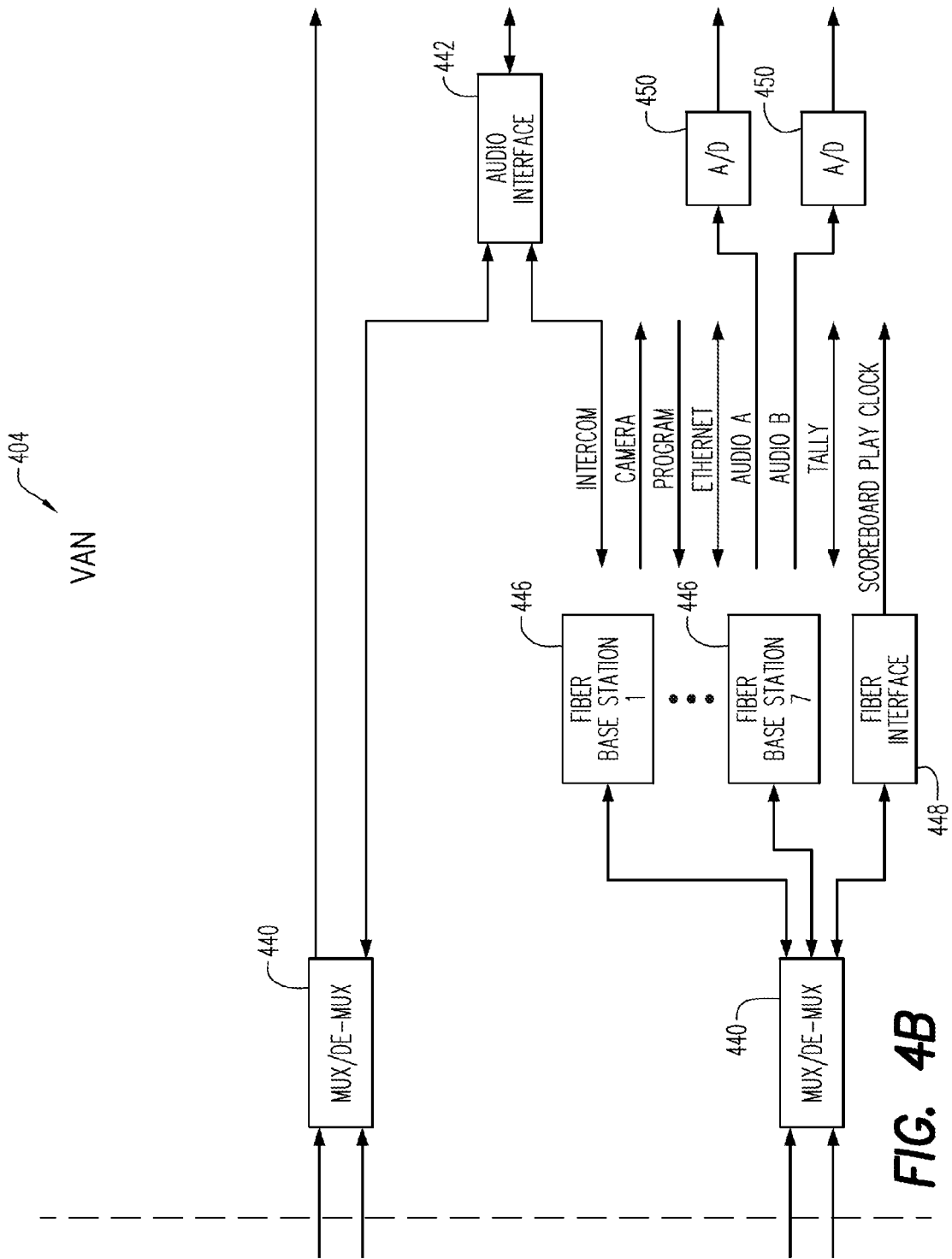
FIG. 4 is a block diagram of components of a remote event site in accordance with some embodiments.
Figure 4C:
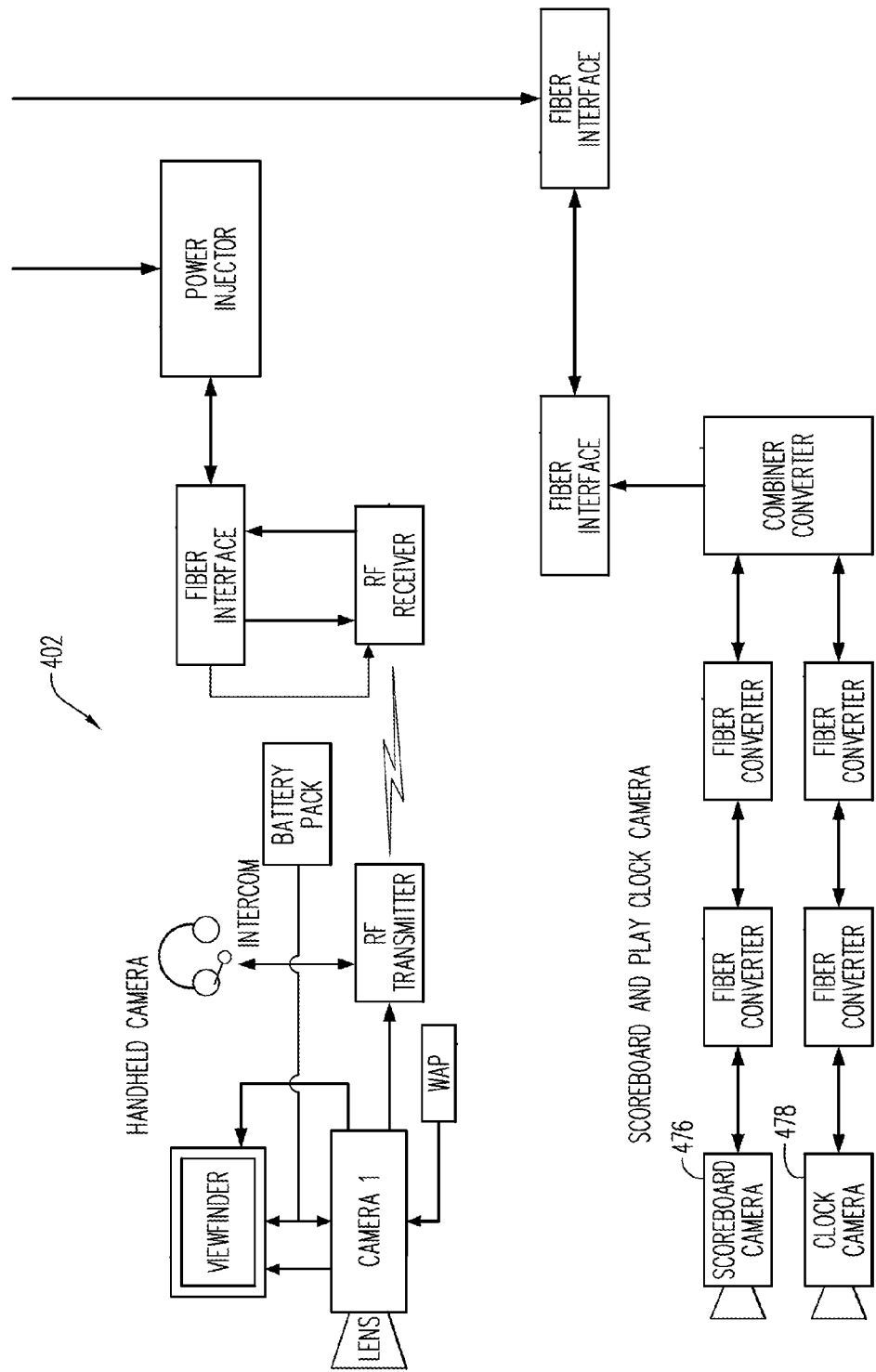

Referring first to FIGS. 4A-4C, a block diagram depicting components that may be deployed at an event (e.g., at an arena 402 and in a van 401) will be described (which generally provide the features of the remote event site described above in conjunction with FIG. 3). As shown, a number of items of equipment may be deployed at an arena 402 to capture video and audio for an event to be broadcast using features of the present invention. The equipment may include one or more microphones 404 capturing effects audio positioned around the arena 402 which provide audio feeds to an audio interface 416 (such as the Adder II audio interface from Telecast Fiber Systems®). Any on-site talent may be equipped with a headset 406 and microphone 408, each of which may be coupled to RF interfaces 410, 412 to transmit audio signals to the audio interface 416. The audio streams are provided to a multiplexor/de-multiplexor 420 (such as a coarse wavelength division multiplexing device provided by Telecast Fiber Systems® or the like). The signals from the audio multiplexor/ de-multiplexor 420 may be transmitted to the van 401 for transmission to the remote production facility (e.g., via a backhaul network as described above in conjunction with FIG. 3), as well as to an audio interface 442 for manipulation by an audio engineer (if needed) for transmission to the production facility.

A number of stationary cameras 422 may also be provided at the arena 402 to capture video images of the event. For example, the cameras 422 may be high definition video cameras such as the model HDCP1 from Sony®. Note that the video cameras may be any device capable of generating a video feed. The camera 422 and interface equipment may vary based on configuration needs, however as an illustrative but not limiting example, each camera 422 may be provided with a viewfinder 424, a fiber interface 426 (such as an interface from Telecast Fiber Systems, or the like), and an intercom 430. The video signals from each camera 422 may be transmitted through a fiber cable to a power injector 432 and then passed to a CWDM de-multiplexor 434 for transmission to the van 404, where the signals again pass through a multiplexor/de-multiplexor 440 for transmission to a number of fiber base stations 446. The camera signals are passed to the production facility (via a backhaul network), and the audio signals from the cameras are converted using A/D converters 450 before transmission to the production facility.

Signals from one or more handheld cameras 460, scoreboard cameras 476, and clock cameras 478 may also be captured, converted and passed to the van 404 for transmission to the remote production facility.

As shown in FIG. 4, much of the support and control equipment typically needed to produce an event broadcast is not required thanks to features of the present invention. Instead, much of the equipment is consolidated at a production control facility, which can use the equipment to produce a number of different event broadcasts each day (without need for the setup, travel, and other overhead associated with traditional live event broadcasts).

Figure 5A:
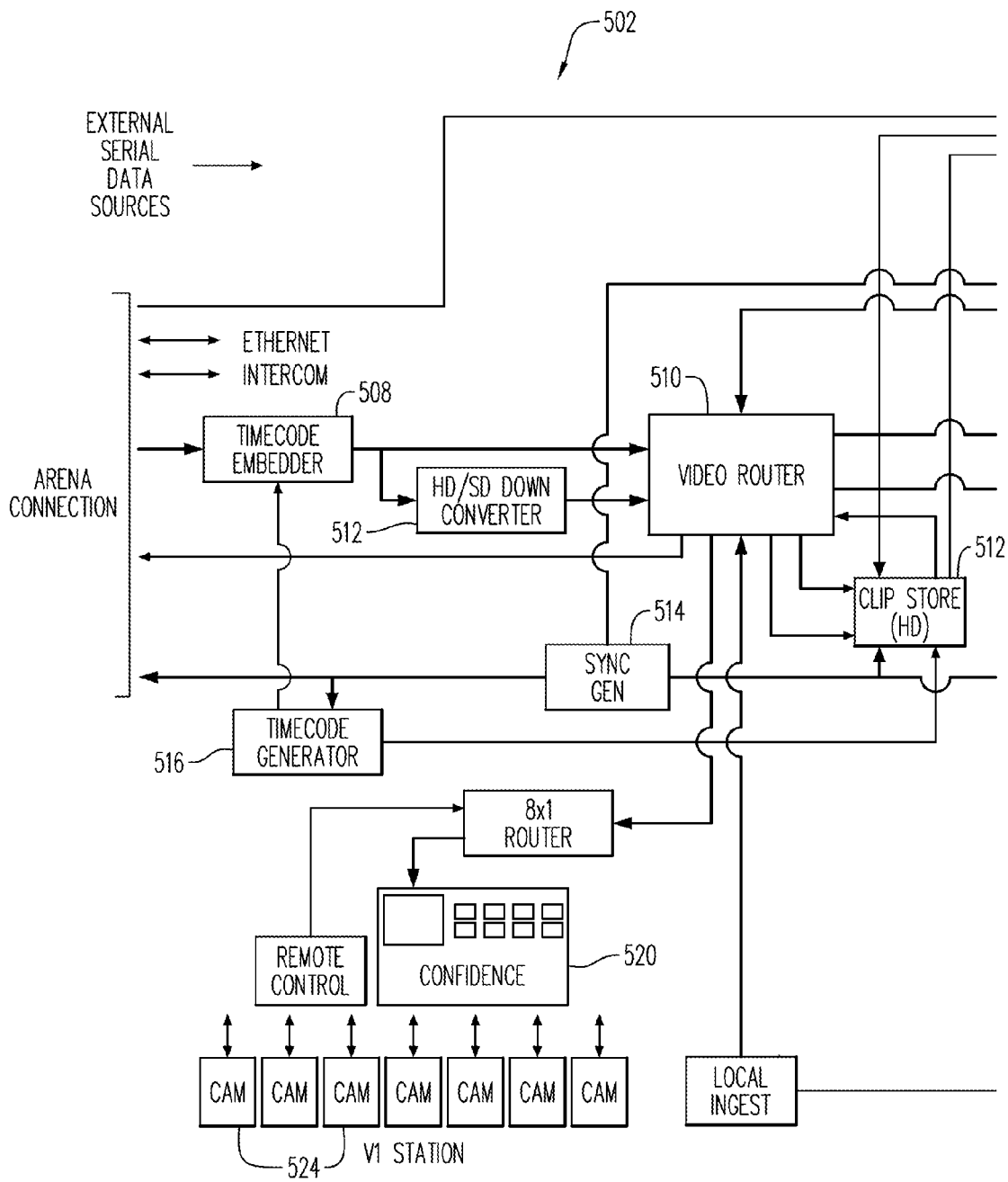
FIG. 5 is a block diagram of components of a remote event site and a production control facility in accordance with some embodiments of the present invention.
Figure 5B:
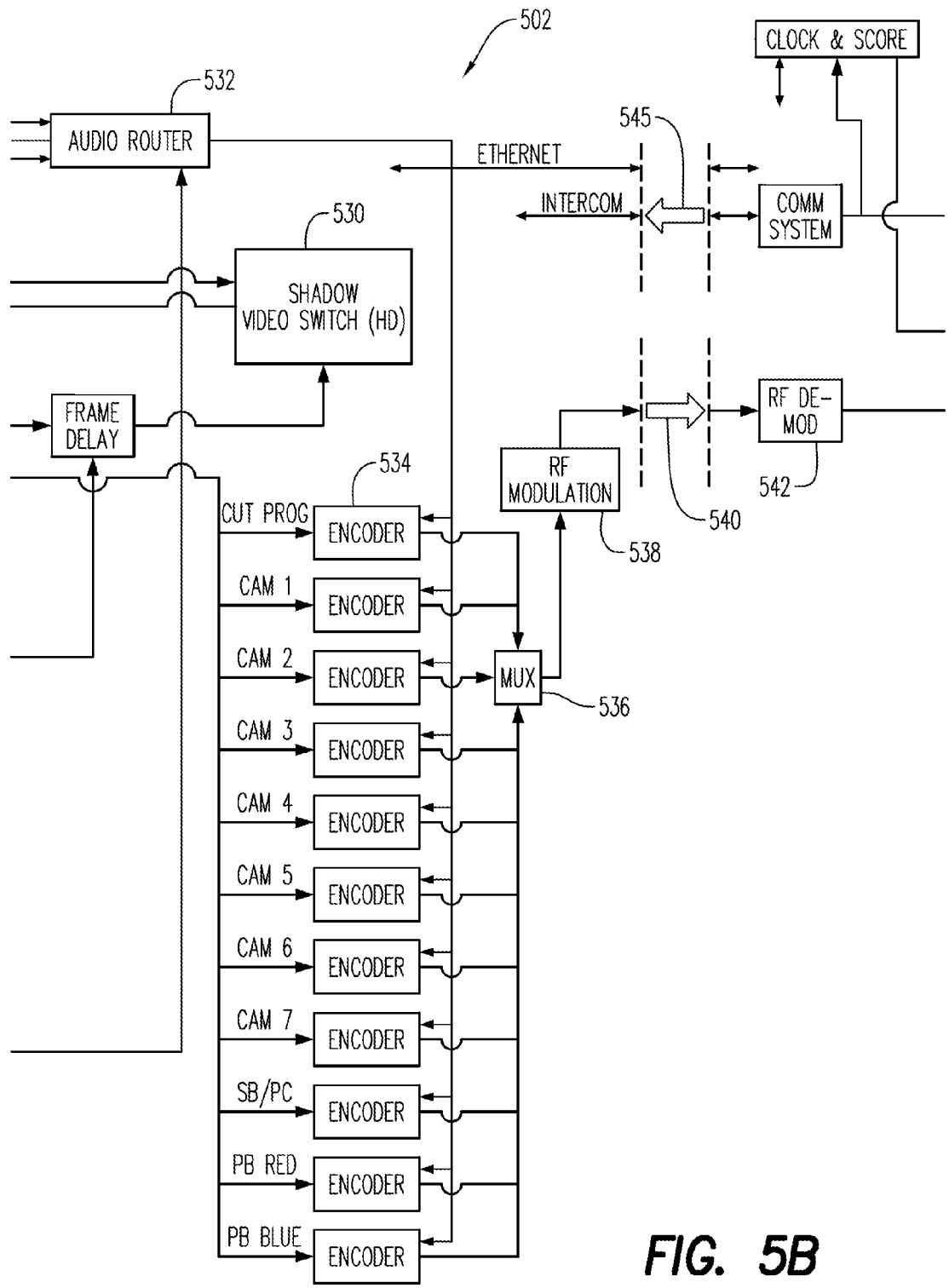
Figure 5C:
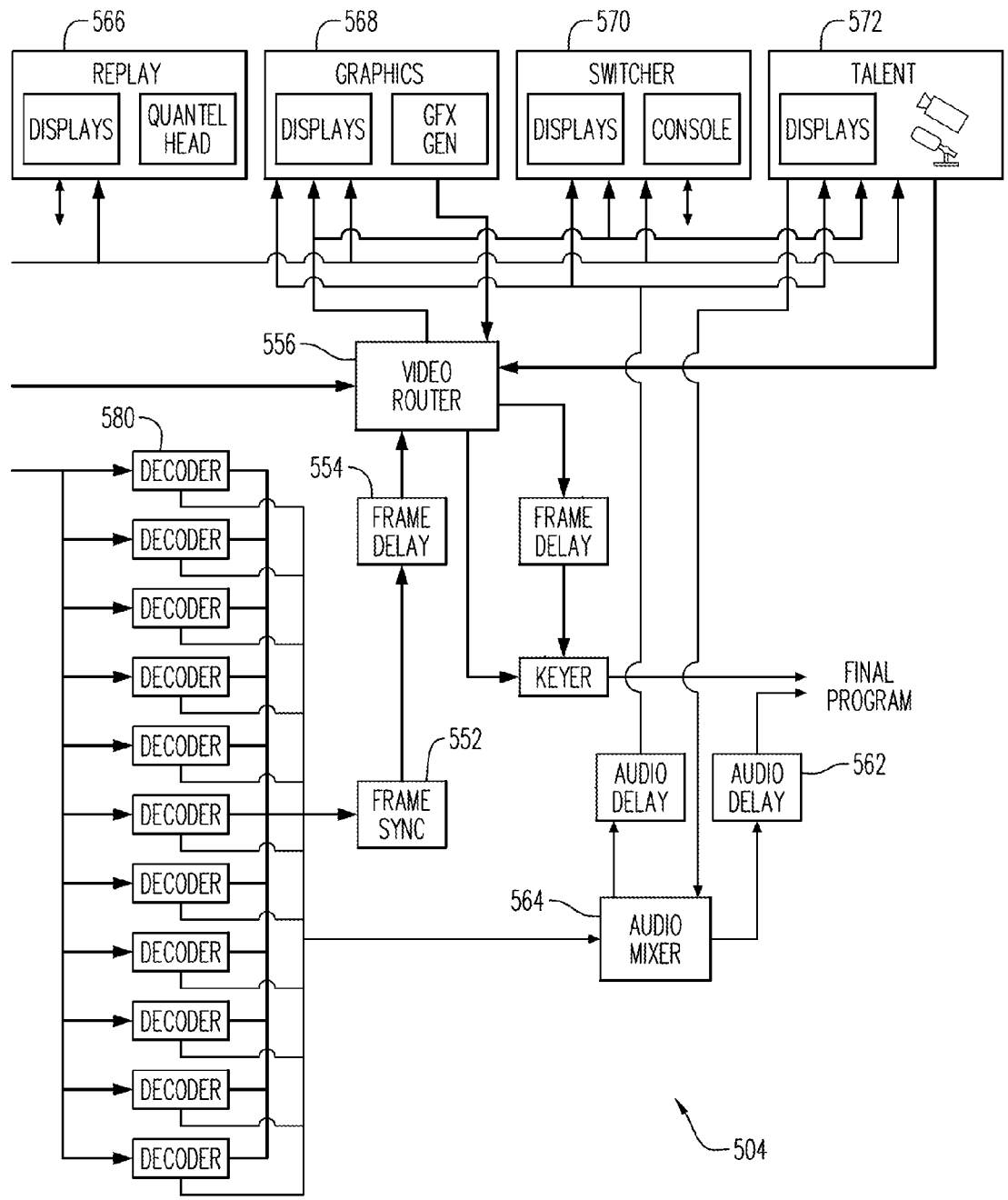

Reference is now made to FIG. 5A-C where an illustrative (but not limiting) example of an implementation of equipment and signal flow at the remote event site 502 and the production control facility 504. The specific configuration is shown for illustrative purposes only; those skilled in the art, upon reading this disclosure, will appreciate that other equipment selections and configurations may also be used.

In the implementation depicted in FIG. 5, the remote event site 502 (e.g., which may be deployed in a van or other properly equipped vehicle) receive video and audio data from cameras and microphones at the arena (such as the cameras and devices shown in FIG. 4). Pursuant to some embodiments of the invention, a timecode embedder 508 is used to establish a time horizon for the event data (such as described in the timing overview provided in FIG. 3 above). For example, the timecode embedder 508 may be one provided by a manufacturer such as Miranda Technologies, Inc., or the like. The timecoded video data are provided to an HD/SD down converter to create the proxy video data as described in FIG. 3 above, and is provided as an input to a video router 510 (which may be a video router from a manufacturer such as Evertz Microsystems Ltd., or the like).

The video router 510 interacts with a clip store 512 to store and access clips. A sync generator 514 is used to synchronize signals and to sync a shadow switch 530 (as described above in FIG. 3). The sync generator also provides inputs to a timecode generator 516 for providing further timing control. Clean camera signals and the cut program (which will be later received from the shadow switch 530) are provided to displays such as a quality control unit 520 and one or more camera stations 524 at the event or in the van.

Audio from the event is provided to an audio router 532 for encoding with the proxy SD video data (e.g., using a plurality of encoders 534) and then multiplexing using a mux 536. The output of the mux 536 is passed through an RF modulator 538 and then transmitted over a backhaul network 540 to the production control facility 504. As shown, a number of video signals are passed through the encoders 534 for eventual transmission to the production control facility 504, including the SD feeds from the arena (shown as CAM 1-7) as well as the eventual cut program feed (shown as CUT PROG). The cut program is delayed by a time as described above in conjunction with FIG. 3 (and requires that the shadow switch 530 first receive commands from a switch at the production facility).

When received at the production control facility, in the case where the backhaul transmission is over a satellite channel, the video and audio data are passed through an RF de-modulator 542 and then decoded using a plurality of decoders 580. A frame sync 552 and frame delay 554 are provided to ensure the video data are set at the appropriate time context, and then passed as inputs to a video router 556 to allow production control of the video data (e.g., by normal interaction by a production team, including use of replay control 566, graphics editing 568, talent production and editing 572 and operation of a switcher 570). The commands entered by the production staff are transmitted over a front haul network 545 back to the shadow switcher 530 at the remote event site to control the production of a cut program.

At the production control facility, the audio data is provided to an audio mixer 564 and an appropriate audio delay is inserted by audio delay devices 562. When the cut program is received from the remote event site (via CUT PROG feed), the cut program is joined with the final audio to produce a final program which may be distributed and broadcast.

Figure 6:
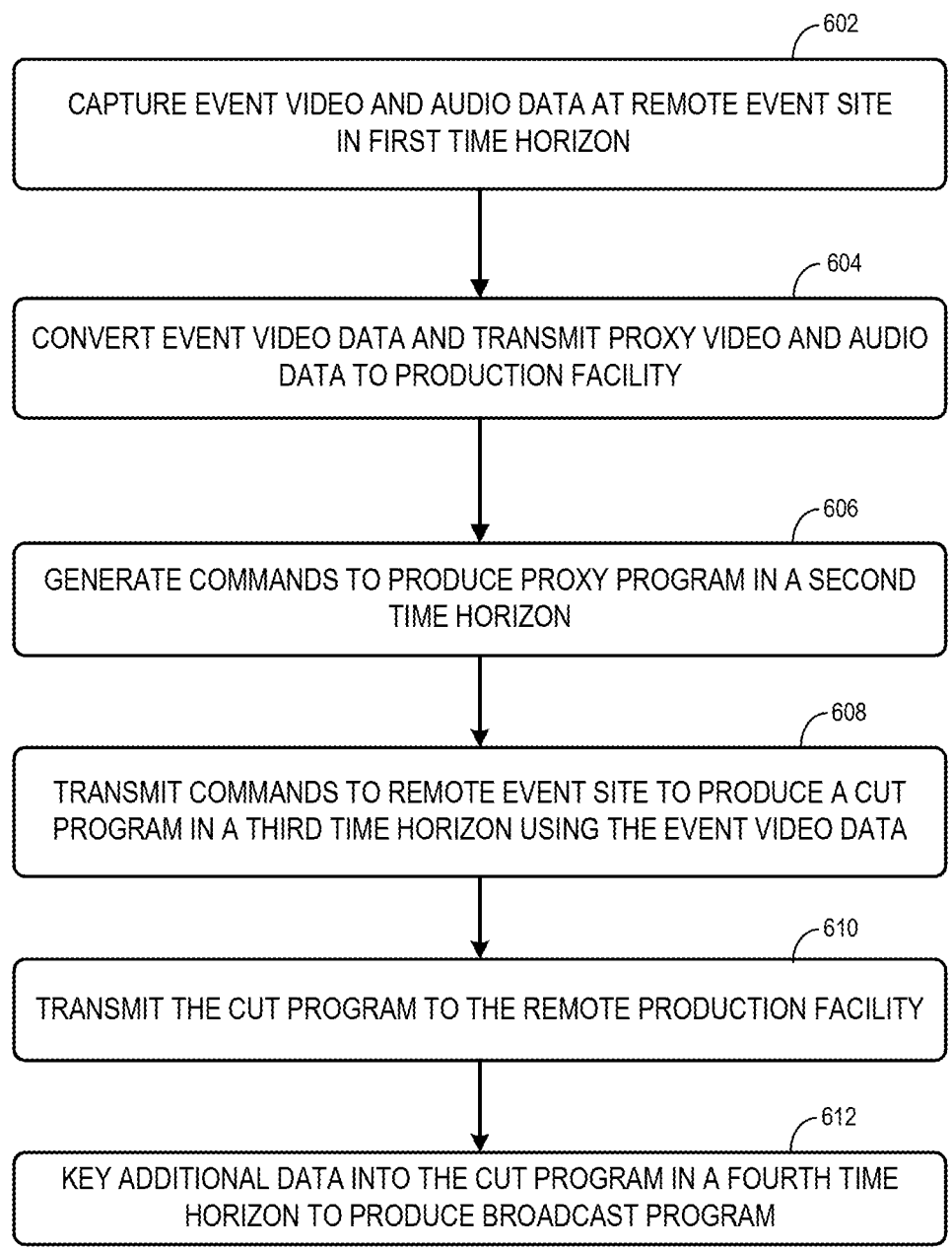
FIG. 6 is a flow diagram of a process in accordance with some embodiments of the present invention.

Reference is now made to FIG. 6 which illustrates a method that might be performed, for example, by some or all of the elements described herein (such as the elements described in conjunction with FIGS. 3-5). The flow charts described herein do not imply a fixed order to the steps, and embodiments of the present invention may be practiced in any order that is practicable. Note that any of the methods described herein may be performed by hardware, software, or any combination of these approaches. For example, a computer-readable storage medium may store thereon instructions that when executed by a machine result in performance according to any of the embodiments described herein.

At 602, video and audio data from a live event is captured. The video and audio data may be captured from devices such as the cameras and microphones positioned and operated at the event (such as in the system described in FIG. 4 above). As used herein, the phrase "video data" may refer to any signal conveying information about a moving image, such as a High Definition-Serial Data Interface ("HD-SDI") signal transmitted in accordance with the Society of Motion Picture and Television Engineers 292M standard. Although HD signals may be described in some examples presented herein, note that embodiments may be associated with any other type of video feed, including a standard broadcast feed and/or a 3D image feed. The video and audio data captured at 602 is associated with a first time horizon (e.g., starting at time t=0).

At 604, the event video data is converted to a proxy signal (e.g., down converted to an SD signal and further compressed using a compression algorithm) to create a proxy video feed. The proxy video and audio data are transmitted to a production control facility over a backhaul (such as a satellite or other network connection). At 606, a production crew at the remote production control facility interacts with the proxy feed and audio to produce a proxy program (e.g., by issuing commands to a switcher (which may be a conventional switcher used in the production of live events). The commands are issued in a second time horizon which is, for example, a known delay period after the first time horizon (and may be generally equal to the delay expected over the backhaul network).

Processing continues at 608 where the commands from the switcher are transmitted to a shadow switcher at the event site to produce a cut program in a third time horizon using the event video and audio data. The third time horizon is further delayed from the second time horizon by a factor generally equivalent to the delay or latency of a fronthaul channel (over which the commands are transmitted). Processing continues at 610 where the cut program is transmitted to the production facility. The transmission is over a backhaul network (and may be transmitted in conjunction with the transmission of subsequent video and audio data which is to be produced shortly thereafter). In embodiments where some or all of the graphics, audio or other effects are inserted at the remote event site or other location, the cut program need not be transmitted at 610.

Processing continues at 612 where operators at the production control facility key any additional data into the cut program in a fourth time horizon to produce broadcast program for distribution. The fourth time horizon is delayed from the third time horizon by a factor approximately equal to the latency of the backhaul network (over which the cut program is transmitted to the production control facility). In this manner, and using such timing controls, embodiments allow the broadcast of live events from a remote production facility. Embodiments allow significant reductions in the amount of equipment and personnel required at the remote event site.

The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Moreover, although specific hardware and data configurations have been described herein, note that any number of other configurations may be provided in accordance with embodiments of the present invention (e.g., some of the information associated with the databases and engines described herein may be split, combined, and/or handled by external systems). Further note that embodiments may be associated with any number of different types of broadcast programs or events (e.g., sports, news, and weather programs).

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

What is claimed is:

1. A method comprising:
   capturing, at an event site, event video data in a first time horizon;
   compressing the event video data to create proxy event video data, the proxy event video data being a representation of the event video data requiring less bandwidth than the event video data,
   transmitting the proxy event video data to a production facility remote from the event site;
   generating, at a switcher device at the production facility, command signals to operate the switcher device to select video feeds to produce a proxy program using the proxy event video data, the command signals associated with a second time horizon delayed from the first time horizon;
   transmitting the command signals used to produce the proxy program to the event site;
   producing a cut program in a third time horizon delayed from the second time horizon, the cut program produced from the event video data by a shadow switcher device at the event site executing the command signals used to produce the proxy program; and
   transmitting the cut program to the production facility.

2. The method of claim 1, further comprising:
   keying, at the production facility, additional data into the cut program in a fourth time horizon, the fourth time horizon delayed from the first, second and third time horizons, to generate a broadcast program.

3. The method of claim 2, wherein the capturing of event video data further includes capturing event audio data and the broadcast program is further generated using the event audio data.

4. The method of claim 2, wherein the compressing of the event video data to create proxy event video data comprises down-converting the event video data.

5. The method of claim 2, wherein at least one of the first time horizon, the second time horizon, the third time horizon, and the fourth time horizon are associated with one or more monotonic identifiers.

6. The method of claim 4, wherein down-converting the event video data comprises down converting high definition ("HD") event video data to standard definition ("SD") event video data.

7. The method of claim 1, wherein transmitting the proxy event video data to a production facility is performed over a backhaul network comprising at least one of (i) a fiber cable and a (ii) a satellite transmission network.

8. The method of claim 6, wherein the second time horizon is based on a latency associated with the backhaul network.

9. The method of claim 6, further comprising transmitting event audio data to the production facility over the backhaul network.

10. The method of claim 6, wherein the transmitting of the cut program to the production facility includes transmitting the cut program over the backhaul network, and where the fourth time horizon further is based on a latency of the backhaul network.

11. The method of claim 1, wherein the transmitting of the commands used to produce the proxy program to the remote event site includes transmitting the command signals used to produce the proxy program over a fronthaul channel, and the third time horizon further is based on a latency associated with the fronthaul channel.

12. The method of claim 1, wherein the broadcast program is an HD program.

13. A mobile production vehicle system for interacting with a production facility to remotely produce a broadcast event, comprising:
   a first subsystem for capturing, at an event site associated with the mobile production vehicle, event video data in a first time horizon;
   a second subsystem for compressing the event video data into proxy event video data that is a representation of the event video data and consumes, when transmitted, less bandwidth than the event video data, and transmitting the proxy event video data to the production facility located remotely from the event site over a backhaul network, the production facility using command signals generated at a switcher device to select video feeds and the proxy event video data to produce a proxy program associated with a second time horizon delayed from the first time horizon;

a shadow switcher subsystem at the mobile production vehicle associated with the event site for responding to the command signals received from a the switcher device at the production facility to produce a cut program in a third time horizon delayed from the second time horizon, the cut program produced by the shadow switcher subsystem by executing the command signals used to produced the proxy event using the event video data; and a transmission subsystem for transmitting the cut program to the production facility over the backhaul network for use in generating a broadcast program.

14. The system of claim 13, wherein the event video data are captured by a plurality of cameras arranged to capture images at the live event.

15. The system of claim 13, wherein the compressing of the event video data to a proxy of the event video data comprises down-converting the event video data to standard definition ("SD") event video data.

16. The system of claim 13, wherein the backhaul network is at least one of (i) a fiber cable and a (ii) a satellite transmission network.

17. The system of claim 16, wherein the second time horizon is based on a latency associated with the backhaul network.

18. The system of claim 16, wherein the transmitting of the cut program to the production facility includes transmitting the cut program over the backhaul network, and where the broadcast program is generated in a fourth time horizon which is based on a latency of the backhaul network.

19. The system of claim 13, wherein the command signals used to produce the proxy program received from the switcher device at the production location are received over a fronthaul channel, and the third time horizon is based on a latency associated with the fronthaul channel.

20. A production system for interacting with a vehicle system at a live event site for producing a broadcast of the live event, comprising:

a master switcher subsystem for receiving proxy event video data that is a representation of event video data captured at the event site and consumes, when transmitted, less bandwidth than the event video data from a vehicle system at the live event, the master switcher subsystem associating the received data with a second time horizon based on a latency of a backhaul network and based on an event time horizon;

controls to interact with the master switcher subsystem to generate command signals to operate the master switcher subsystem to select video feeds to produce a proxy program using the proxy event video data, the command signals used to produce the proxy program associated with the second time horizon;

a fronthaul network communication subsystem for transmitting the command signals used to produce the proxy program to the vehicle system at the event site, for use by a shadow switcher device at the vehicle system;

a backhaul network communication subsystem for receiving a cut program from the vehicle system, the cut program generated by the shadow switcher device at the vehicle system under control of the command signals to produce the proxy program using the event video data in a third time horizon based on a latency of the fronthaul network and the second time horizon; and a keyer subsystem for keying additional data into the cut program in a fourth time horizon, the fourth time horizon based on a latency of the backhaul network and the third time horizon and for producing a final broadcast program.

21. A method comprising:

receiving proxy event video data from a remote event site, the proxy event video data being a representation of event video data captured at an event site and requiring less bandwidth than the event video data;

generating, using a master switcher device, command signals to operate the master switcher device to select video feeds to produce a proxy program using the proxy event video data;

transmitting the command signals used to produce the proxy program to the remote event site for use in controlling a shadow switcher device at the remote event site to produce a cut program by executing the command signals used to produce the proxy program using event video data; and receiving the cut program from the remote event site, the cut program created at the remote event site using the command signals used to produce the proxy program.

22. A method, comprising:

capturing, at a remote event site, event video data in a first time horizon;

compressing the event video data to create proxy event video data, the proxy event video data being a representation of the event video data requiring less bandwidth than the event video data, and transmitting the proxy event video data to a production facility located remotely from the event site, the proxy event video data being a representation of the event video data that, when transmitted, consumes less bandwidth than the event video data;

receiving, from the production facility, command signals used to produce a proxy program at the production facility by a switcher device to cause a shadow switcher device at the remote event site to produce a cut program in a time horizon delayed from the first time horizon, the cut program produced using the command signals and the event video data; and transmitting the cut program to the production facility.

* * * * *